(12) United States Patent
Yang et al.

(10) Patent No.: US 8,969,486 B2
(45) Date of Patent: *Mar. 3, 2015

(54) LIQUID CRYSTAL ALIGNMENT AGENT, LIQUID CRYSTAL ALIGNMENT FILM USING THE SAME, AND LIQUID CRYSTAL DISPLAY DEVICE INCLUDING THE LIQUID CRYSTAL ALIGNMENT FILM

(75) Inventors: Jae-Deuk Yang, Uiwang-si (KR); Yong-Sik Yoo, Uiwang-si (KR); Guk-Pyo Jo, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 105 days.

This patent is subject to a terminal disclaimer.

(21) Appl. No.: 13/591,614

(22) Filed: Aug. 22, 2012

(65) Prior Publication Data

US 2013/0158208 A1   Jun. 20, 2013

(30) Foreign Application Priority Data

Dec. 19, 2011 (KR) .......................... 10-2011-0137453

(51) Int. Cl.
| | |
|---|---|
| C07C 229/42 | (2006.01) |
| C08G 69/08 | (2006.01) |
| C08G 73/10 | (2006.01) |
| C09K 19/56 | (2006.01) |
| C08L 79/08 | (2006.01) |

(52) U.S. Cl.
USPC .... 525/432; 252/299.4; 428/1.26; 428/473.5; 428/474.4; 349/123; 349/127; 525/420; 525/436; 528/350; 528/353

(58) Field of Classification Search
USPC .................. 525/420, 432, 436; 528/350, 353; 428/1.26, 473.5, 474.4; 252/299.4; 349/123, 127
See application file for complete search history.

(56) References Cited

U.S. PATENT DOCUMENTS

| | | | |
|---|---|---|---|
| 3,574,160 A | 4/1971 | Hsu et al. |
| 4,985,529 A | 1/1991 | Saito et al. |
| 5,756,649 A | 5/1998 | Mizushima |
| 6,307,002 B1 | 10/2001 | Okada et al. |
| 6,887,534 B2 | 5/2005 | Nakata et al. |
| 7,303,792 B2 | 12/2007 | Hosaka et al. |
| 7,901,745 B2 | 3/2011 | Oh et al. |
| 8,057,700 B2 | 11/2011 | Oh et al. |
| 8,173,749 B2 | 5/2012 | Bachels et al. |
| 8,329,823 B2 | 12/2012 | Bachels et al. |

(Continued)

FOREIGN PATENT DOCUMENTS

| | | |
|---|---|---|
| CN | 1140195 A | 1/1997 |
| CN | 101346342 A | 1/2009 |

(Continued)

OTHER PUBLICATIONS

European Search Report in commonly owned European Application No. 11174615.2 dated Apr. 16, 2013, pp. 1-7.

(Continued)

Primary Examiner — Ana Woodward
(74) Attorney, Agent, or Firm — Additon, Higgins & Pendleton, P.A.

(57) ABSTRACT

Disclosed are a liquid crystal alignment agent, a liquid crystal alignment film manufactured using the same, and a liquid crystal display including the liquid crystal alignment film. The liquid crystal alignment agent includes a polymer comprising a polyamic acid including a repeating unit represented by Chemical Formula 1, polyimide including a repeating unit represented by Chemical Formula 2, or a combination thereof:

[Chemical Formula 1]

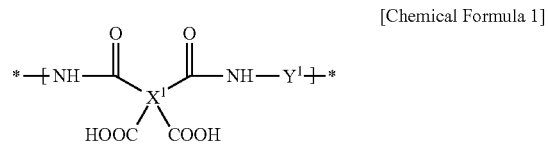

[Chemical Formula 2]

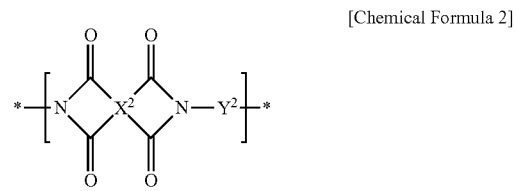

wherein $Y^1$ and $Y^2$ are each independently a divalent organic group derived from diamine, wherein the diamine includes photodiamine represented by Chemical Formula 3 and functional diamine represented by Chemical Formula 5:

[Chemical Formula 3]

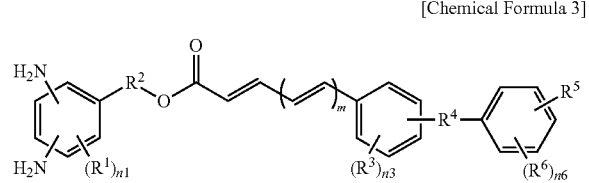

[Chemical Formula 5]

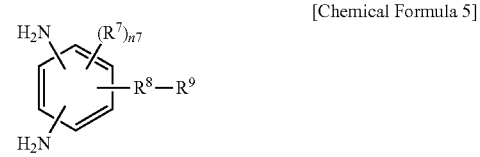

and wherein the other substituents are the same as defined in the detailed description.

8 Claims, No Drawings

(56) References Cited

U.S. PATENT DOCUMENTS

| | | | |
|---|---|---|---|
| 8,557,922 | B2 | 10/2013 | Bachels et al. |
| 2001/0046570 | A1 | 11/2001 | Gibbons et al. |
| 2004/0009310 | A1 | 1/2004 | Nakata et al. |
| 2006/0142538 | A1 | 6/2006 | Tsutsui et al. |
| 2007/0036915 | A1 | 2/2007 | Kurosaki et al. |
| 2007/0093640 | A1 | 4/2007 | Kim et al. |
| 2007/0128378 | A1 | 6/2007 | Kim et al. |
| 2008/0213510 | A1 | 9/2008 | Kwak et al. |
| 2008/0293888 | A1 | 11/2008 | Bachels et al. |
| 2009/0146105 | A1 | 6/2009 | Oh et al. |
| 2009/0299014 | A1 | 12/2009 | Oh et al. |
| 2010/0047482 | A1 | 2/2010 | Kim et al. |
| 2010/0048849 | A1 | 2/2010 | Eckert et al. |
| 2010/0085523 | A1 | 4/2010 | Terashita et al. |
| 2011/0065859 | A1 | 3/2011 | Bury et al. |
| 2011/0144299 | A1 | 6/2011 | Yang et al. |
| 2012/0013837 | A1 | 1/2012 | Terashita et al. |
| 2012/0172540 | A1 | 7/2012 | Yang et al. |

FOREIGN PATENT DOCUMENTS

| | | | |
|---|---|---|---|
| CN | 101452154 | A | 6/2009 |
| CN | 101570635 | A | 11/2009 |
| CN | 102102019 | | 6/2011 |
| CN | 102241990 | A | 11/2011 |
| CN | 102559205 | A | 7/2012 |
| EP | 1801097 | A1 | 6/2007 |
| EP | 1975687 | A1 | 10/2008 |
| EP | 2308826 | A1 | 4/2011 |
| JP | 59-145216 | | 8/1984 |
| JP | 61-059334 | | 3/1986 |
| JP | 2743460 | | 11/1990 |
| JP | 05-119323 | A | 5/1993 |
| JP | 08-208983 | | 8/1996 |
| JP | 09-080440 | | 3/1997 |
| JP | 3322089 | | 3/1997 |
| JP | 09-272740 | | 10/1997 |
| JP | 10183120 | | 7/1998 |
| JP | 2004-020658 | | 1/2004 |
| JP | 2004-067589 | | 3/2004 |
| JP | 2004-170718 | A | 6/2004 |
| JP | 2005-037920 | | 2/2005 |
| JP | 2006-089492 | A | 4/2006 |
| JP | 2007-047762 | | 2/2007 |
| JP | 2007-047762 | A | 2/2007 |
| JP | 2008-203641 | A | 9/2008 |
| JP | 2008-262170 | A | 10/2008 |
| JP | 2009-037104 | | 2/2009 |
| KR | 10-1998-0059346 | | 10/1998 |
| KR | 100213178 | | 5/1999 |
| KR | 1020000035320 | A | 6/2000 |
| KR | 10-2001-0002925 | A | 1/2001 |
| KR | 1020020068695 | A | 8/2002 |
| KR | 10-2003-0088503 | A | 11/2003 |
| KR | 10-2004-0050166 | A | 6/2004 |
| KR | 1020040083610 | A | 10/2004 |
| KR | 1020050065051 | A | 6/2005 |
| KR | 10-2005-0084995 | A | 8/2005 |
| KR | 10-2005-0106423 | | 11/2005 |
| KR | 2006-0115682 | | 11/2006 |
| KR | 10-2006-0123178 | A | 12/2006 |
| KR | 1020070057658 | | 6/2007 |
| KR | 10-2007-0071997 | A | 7/2007 |
| KR | 10-083778 | B1 | 6/2008 |
| KR | 10-2008-0080663 | A | 9/2008 |
| KR | 10-2008-0081846 | A | 9/2008 |
| KR | 10-2009-0008730 | A | 1/2009 |
| KR | 10-2009-0056926 | A | 6/2009 |
| KR | 10-2009-0059989 | A | 6/2009 |
| KR | 10-2009-0060000 | A | 6/2009 |
| KR | 10-2009-0061567 | A | 6/2009 |
| KR | 10-2009-0066077 | A | 6/2009 |
| KR | 10-2009-0068077 | A | 6/2009 |
| KR | 10-2009-0091664 | A | 8/2009 |
| KR | 10-0913605 | A | 8/2009 |
| KR | 10-2009-0102698 | A | 9/2009 |
| KR | 10-2009-0103871 | A | 10/2009 |
| KR | 10-2009-0115072 | A | 11/2009 |
| KR | 10-2010-0017575 | A | 2/2010 |
| KR | 10-2010-0021491 | A | 2/2010 |
| KR | 10-2010-0023122 | A | 3/2010 |
| KR | 10-2010-0057086 | A | 5/2010 |
| KR | 2010-0112073 | A | 10/2010 |
| KR | 10-2011-0068519 | A | 6/2011 |
| KR | 10-2011-0068520 | A | 6/2011 |
| KR | 10-2011-0068523 | A | 6/2011 |
| KR | 10-2011-0072173 | A | 6/2011 |
| KR | 2011-0072176 | A | 6/2011 |
| KR | 2011-0082589 | A | 7/2011 |
| KR | 10-1056424 | A | 8/2011 |
| KR | 2011-0096094 | A | 8/2011 |
| KR | 2011-0109839 | A | 10/2011 |
| TW | 200906911 | | 2/2009 |
| WO | 2007071091 | A1 | 6/2007 |
| WO | 2008/119449 | A1 | 10/2008 |
| WO | 2008/126978 | | 10/2008 |
| WO | 2008/135131 | A1 | 11/2008 |
| WO | 2008/153286 | A2 | 12/2008 |
| WO | 2010/079637 | A1 | 7/2010 |
| WO | 2011/028586 | A1 | 3/2011 |

OTHER PUBLICATIONS

Pattanaargson et al., "Photoisomerization of octyl methoxycinnamate", Journal of Photochemistry and Photobiology, A Chemistry, vol. 161 (2004) pp. 269-274.
Chinese Search Report issued in commonly owned Chinese Application No. 201110189948.2 dated Sep. 3, 2013, pp. 1-3.
USPTO structure search, Aug. 2012, pp. 1-2.
Office Action in commonly owned U.S. Appl. No. 12/873,420, mailed Aug. 29, 2012, pp. 1-8.
USPTO structure search, Jan. 2013, pp. 1-112.
Notice of Allowance in commonly owned U.S. Appl. No. 13/238,450 mailed on Feb. 28, 2013, pp. 1-8.
Notice of Allowance in commonly owned U.S. Appl. No. 12/873,420 mailed on Mar. 18, 2013, pp. 1-6.
International Search Report in commonly owned International Application No. PCT/KR2007/006898, mailed Feb. 18, 2008.
Office Action in commonly owned U.S. Appl. No. 12/873,420 mailed Aug. 29, 2012, pp. 1-9.
Office Action in commonly owned U.S. Appl. No. 12/329,139 mailed Jan. 20, 2011, pp. 1-4.
Notice of Allowance in commonly owned U.S. Appl. No. 12/329,139 mailed Sep. 14, 2011, pp. 1-5.
Notice of Allowance in commonly owned U.S. Appl. No. 12/476,465 mailed Oct. 28, 2010, pp. 1-15.
Office Action in commonly owned U.S. Appl. No. 13/238,569 mailed Mar. 25, 2013, pp. 1-8.
Office Action in commonly owned U.S. Appl. No. 13/353,559 mailed May 8, 2013, pp. 1-8.
Search Report issued in counterpart Chinese Application No. 201210279729.8 dated Feb. 11, 2014, pp. 1-2.
English-translation of Search Report issued in counterpart Chinese Application No. 201210279729.8 dated Feb. 11, 2014, pp. 1-2.
Chinese Search Report in commonly owned Chinese Application No. 201210289366.6 dated Mar. 3, 2014, pp. 1-3.
English-translation of Chinese Search Report in commonly owned Chinese Application No. 201210289366.6 dated Mar. 3, 2014, pp. 1-2.
Notice of Allowance in commonly owned U.S. Appl. No. 13/238,569 dated Aug. 28, 2013, pp. 1-9.
Office Action in commonly owned U.S. Appl. No. 13/591,517 mailed Oct. 24, 2014, pp. 1-16.

LIQUID CRYSTAL ALIGNMENT AGENT, LIQUID CRYSTAL ALIGNMENT FILM USING THE SAME, AND LIQUID CRYSTAL DISPLAY DEVICE INCLUDING THE LIQUID CRYSTAL ALIGNMENT FILM

CROSS-REFERENCE TO RELATED APPLICATIONS

This application claims priority to and the benefit of Korean Patent Application No. 10-2011-0137453 filed in the Korean Intellectual Property Office on Dec. 19, 2011, the entire disclosure of which is incorporated herein by reference.

FIELD

This disclosure relates to a liquid crystal alignment agent, a liquid crystal alignment film manufactured using the same, and a liquid crystal display including the liquid crystal alignment film.

BACKGROUND

A liquid crystal display device (LCD) includes liquid crystal twisted 90 degrees between a polarizer and an analyzer which have vertically polarization directions to each other. When applying no voltage, the linearly-polarized light passing the polarizer is locally rotated along with the direction of another liquid crystal alignment body and deflected in 90 degrees. As a result, the light is rotated and passed through an analyzer while passing a liquid crystal layer. When applying voltage, since the liquid crystal is aligned in a direction parallel to the electric field direction, the linearly-polarized light is passed through the liquid crystal layer without rotation, so it is blocked by the analyzer due to the vertically-polarized direction of analyzer, so not to be passed. Thereby, light may be selectively transmitted by controlling the liquid crystal. Thus, it is very important to uniformly align the liquid crystal throughout the whole LCD panel in order to provide uniform brightness and a high contrast ratio.

The conventional method of aligning the liquid crystal includes coating a polymer membrane such as a polyimide on a substrate made of a material such as glass, and rubbing the surface of the substrate with a fiber such as nylon or polyester in a predetermined direction. However, the rubbing method may cause serious problems while fabricating a liquid crystal panel due to fine dust or electrostatic discharge (ESD) that may be generated while rubbing the polymer membrane with the fiber.

Recently, there has been research on a photo-alignment method to cause a photo-crosslinking reaction and the like anisotropically by polarized photo-radiation rather than friction to thus bring about anisotropy on the surface of a polymer, and align liquid crystal molecules in one direction.

As polymer film materials for the photo-alignment method, polymers having photo-functional groups such as azobenzene, cumarine, chalcone, and cinnamate have been suggested. To prepare the polymers with photo-functional groups, dinitro-based compounds with excellent stability have been used. However, since double bonds where photo-crosslinking occurs may be broken down due to polarized photo-radiation in the course of preparing the polymers with photo-functional groups, it is difficult to use the dinitro-based compounds as a photo-alignment agent. In addition, the process of preparing the diamine including a photo-functional group can be too complicated to be economical.

SUMMARY

One embodiment provides a liquid crystal alignment agent which can maintain a stable parallel photoalignment, prevent light leakage, and have excellent electrical properties.

Another embodiment provides a liquid crystal alignment film manufactured using the liquid crystal alignment agent.

Yet another embodiment provides a liquid crystal display including the liquid crystal alignment film.

According to one embodiment, provided is a liquid crystal alignment agent that includes a polymer comprising polyamic acid including a repeating unit represented by the following Chemical Formula 1, polyimide including a repeating unit represented by the following Chemical Formula 2, or a combination thereof.

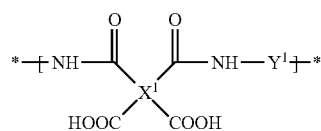

[Chemical Formula 1]

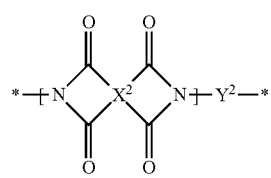

[Chemical Formula 2]

In Chemical Formulae 1 and 2, $X^1$ and $X^2$ are the same or different and are each independently a tetravalent organic group derived from alicyclic acid dianhydride or aromatic acid dianhydride, and $Y^1$ and $Y^2$ are the same or different and are each independently a divalent organic group derived from diamine, wherein the diamine includes a photodiamine represented by the following Chemical Formula 3 and a functional diamine represented by the following Chemical Formula 5.

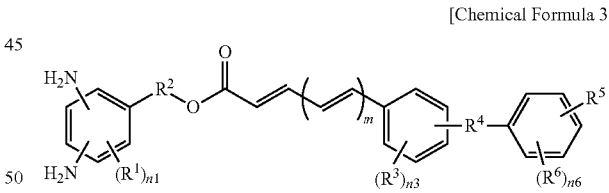

[Chemical Formula 3]

In Chemical Formula 3, $R^1$, $R^3$, and $R^6$ are the same or different and are each independently hydrogen or substituted or unsubstituted C1 to C10 alkyl, $R^2$ and $R^4$ are the same or different and are each independently a single bond, substituted or unsubstituted C1 to C10 alkylene, —O—, —CO—O—, —CO—NH—, —NH—CO—, or —O—CO—, $R^5$ is substituted or unsubstituted C1 to C30 alkyl, substituted or unsubstituted C1 to C30 alkoxy, or a substituted or unsubstituted C2 to C30 ether group, $n^1$ is an integer ranging from 0 to 3, $n^3$ and $n^6$ are the same or different and are each independently integers ranging from 0 to 4, and m is an integer ranging from 1 to 5.

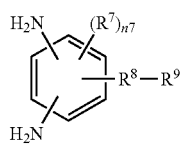

[Chemical Formula 5]

In Chemical Formula 5, each $R^7$ is the same or different and is each independently hydrogen, substituted or unsubstituted C1 to C20 alkyl, substituted or unsubstituted C6 to C30 aryl, or substituted or unsubstituted C2 to C30 heteroaryl, $R^5$ is a single bond, —O—, —S—, —NH—, —CO—, —CO—O—, —O—CO—, —CO—NH—, or —NH—CO—, $R^9$ is hydrogen, a substituted or unsubstituted C1 to C40 aliphatic organic group, a substituted or unsubstituted C2 to C40 aromatic organic group, or a substituted or unsubstituted C3 to C40 alicyclic organic group, and $n^7$ is an integer ranging from 0 to 3.

The photodiamine may include a compound represented by the following Chemical Formula 4.

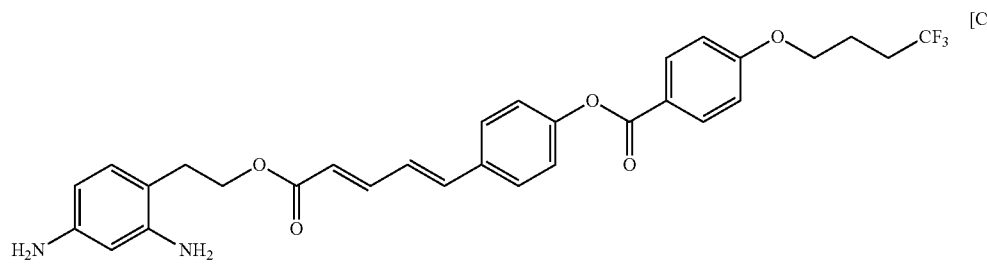

[Chemical Formula 4]

The functional diamine may include a compound represented by the following Chemical Formula 6.

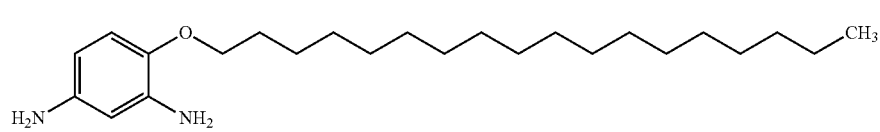

[Chemical Formula 6]

The diamine may include about 50 to about 95 mol % of the photodiamine and about 5 to about 50 mol % of the functional diamine.

The diamine may further include at least one aromatic diamine selected from compounds represented by the following Chemical Formulae 7-1 to 7-4.

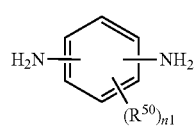

[Chemical Formula 7-1]

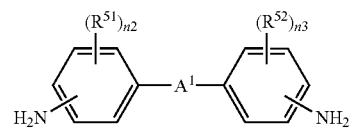

[Chemical Formula 7-2]

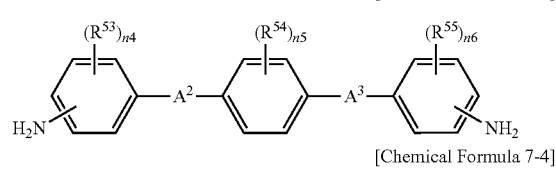

[Chemical Formula 7-3]

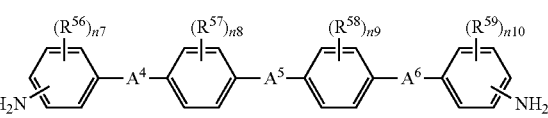

[Chemical Formula 7-4]

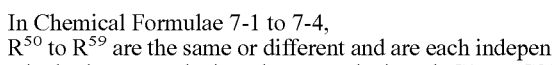

In Chemical Formulae 7-1 to 7-4, $R^{50}$ to $R^{59}$ are the same or different and are each independently hydrogen, substituted or unsubstituted C1 to C20 alkyl, substituted or unsubstituted C6 to C30 aryl, or substituted or unsubstituted C2 to C30 heteroaryl, wherein each of the alkyl, aryl, and heteroaryl further includes a substituent comprising —O—, —CO—O—, —CO—NH—, —NH—CO—, —O—CO—, or a combination thereof, $A^1$ to $A^6$ are the same or different and are each independently a single bond, —O—, —SO$_2$— or —C($R^{203}$)($R^{204}$)— (wherein, $R^{203}$ and $R^{204}$ are the same or different and are each independently hydrogen or a substituted or unsubstituted C1 to C6 alkyl), and $n^1$ to $n^{10}$ are the same or different and are each independently integers ranging from 0 to 4.

The diamine may include about 50 to about 70 mol % of the photodiamine, about 5 to about 30 mol % of the functional diamine, and about 5 to about 30 mol % of the aromatic diamine.

Each of the polyamic acid and the polyimide may have a weight average molecular weight of about 10,000 to about 300,000 g/mol.

When the polymer includes both the polyamic acid and the polyimide, the polyamic acid and the polyimide may be included in a weight ratio of about 1:99 to about 50:50.

The liquid crystal alignment agent may have a solid content of about 0.1 to about 30 wt %.

According to another embodiment, a liquid crystal alignment film that is manufactured using the liquid crystal alignment agent on a substrate is provided.

According to yet another embodiment, a liquid crystal display including the liquid crystal alignment film is provided.

Hereinafter, further embodiments will be described in detail.

A liquid crystal alignment agent that can maintain a stable parallel photoalignment, prevent light leakage, and have excellent electrical properties may be provided and thus, a liquid crystal alignment film having excellent parallel alignment may be provided.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with halogen (F, Cl, Br, or I), hydroxyl, C1 to C20 alkoxy, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, a C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "alkylenearyl" may refer to a substituent including C1 to C20 alkylene linked to C6 to C30 aryl, the term "arylenealkyl" may refer to a substituent including C6 to C30 arylene linked to C1 to C20 group, the term "alkylenearylene" may refer to a substituent including C1 to C20 alkylene linked to C6 to C30 arylene, and the term "arylenealkylene" may refer to a substituent including C6 to C30 arylene linked to C1 to C20 alkylene.

As used herein, when a specific definition is not otherwise provided, the term "hetero" may refer to a hetero atom including N, O, S, P or a combination thereof in a ring.

As used herein, when a specific definition is not otherwise provided, the term "aliphatic" may refer to C1 to C40 alkyl, C2 to C40 alkenyl, C2 to C40 alkynyl, C1 to C40 alkylene, C2 to C40 alkenylene, or C2 to C40 alkynylene, for example C1 to C20 alkyl, C2 to C20 alkenyl, C2 to C20 alkynyl, C1 to C20 alkylene, C2 to C20 alkenylene, or C2 to C20 alkynylene, the term "alicyclic" may refer to C3 to C40 cycloalkyl, C3 to C40 cycloalkenyl, C3 to C40 cycloalkynyl, C3 to C40 cycloalkylene, C3 to C40 cycloalkenylene, or C3 to C40 cycloalkynylene, for example C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" may refer to C6 to C40 aryl, C2 to C40 heteroaryl, C6 to C40 arylene, or C2 to C40 heteroarylene, for example C6 to C16 aryl, C2 to C16 heteroaryl, C6 to C16 arylene, or C2 to C16 heteroarylene.

As used herein, when a specific definition is not otherwise provided, the term "(meth)acrylate" may refer to "acrylate" and "methacrylate", and the term "(meth)acrylic acid" may refer to "acrylic acid" and "methacrylic acid."

As used herein, when a specific definition is not otherwise provided, the term "combination" may refer to a mixture or copolymerization, and in an alicyclic organic group and an aromatic organic group, at least two rings form a fused ring fused ring, or at least two rings are linked through a functional group of a single bond, O, S, C(=O), CH(OH), S(=O), $S(=O)_2$, $Si(CH_3)_2$, $(CH_2)_p$ (wherein, $(CF_2)_q$ (wherein, $1 \leq q \leq 2$), $C(CH_3)_2$, $C(CF_3)_2$, $C(CH_3)(CF_3)$, or C(=O)NH. Herein, the term "copolymerization" may refer to block copolymerization, random copolymerization, or graft copolymerization, and the term "copolymer" may refer to a block copolymer, a random copolymer, or a graft copolymer.

The liquid crystal alignment agent according to one embodiment includes a polymer, which will be described hereinafter.

(A) Polymer

The polymer may include polyamic acid including a repeating unit represented by the following Chemical Formula 1, polyimide including a repeating unit represented by the following Chemical Formula 2, or a combination thereof.

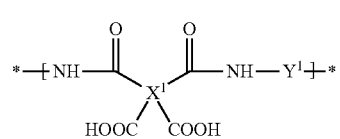

[Chemical Formula 1]

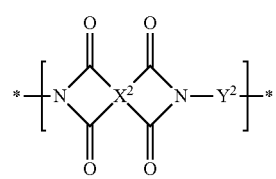

[Chemical Formula 2]

In Chemical Formulae 1 and 2, $X^1$ and $X^2$ are the same or different and are each independently a tetravalent organic group derived from alicyclic acid dianhydride or aromatic acid dianhydride.

In Chemical Formulae 1 and 2, $Y^1$ and $Y^2$ are the same or different and are each independently a divalent organic group derived from diamine, wherein the diamine may include a photodiamine and a functional diamine.

The photodiamine may be a compound represented by the following Chemical Formula 3.

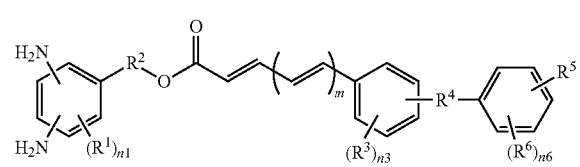

[Chemical Formula 3]

In Chemical Formula 3, $R^1$, $R^3$ and $R^6$ are the same or different and are each independently hydrogen or substituted or unsubstituted C1 to C10 alkyl.

In Chemical Formula 3, $R^2$ and $R^4$ are the same or different and are each independently a single bond, substituted or unsubstituted C1 to C10 alkylene, —O—, —CO—O—, —CO—NH—, —NH—CO— or —O—CO—.

In Chemical Formula 3, $R^5$ is substituted or unsubstituted C1 to C30 alkyl group, substituted or unsubstituted C1 to C30 alkoxy, or a substituted or unsubstituted C2 to C30 ether group.

In Chemical Formula 3, $n^1$ may be an integer of 0 to 3, and $n^3$ and $n^6$ are the same or different and are each independently an integer of 0 to 4.

In Chemical Formula 3, m may be an integer of 1 to 5. When m is within the above range, in other words, a compound having a conjugate double bond as a photodiamine is used to prepare a liquid crystal alignment agent, the prepared polymer may have parallel photoalignment and increased photoreactivity. Accordingly, when liquid crystals are aligned in a rubbing method, fine dirt or electrostatic discharge (ESD) may not be generated.

The liquid crystal molecular alignment may include three kinds of alignments such as a vertical alignment, a parallel alignment, and a tilted alignment. The vertical alignment denotes that liquid crystal molecules are aligned in a long-axis direction vertical to the surface of a substrate, the parallel alignment denotes that liquid crystal molecules are aligned in a long-axis direction parallel to the surface of a substrate, and the tilted alignment denotes that liquid crystal molecules are aligned in a long-axis direction tilted with a predetermined angle to the surface of a substrate. The alignments are all obtained by treating the surface of a substrate to form an alignment layer thereon. These liquid crystal molecular alignments may apply different properties to liquid crystals and vary a response to an external stimulus such as an electric field and the like.

According to one embodiment, a liquid crystal alignment agent is prepared by using a compound having a conjugate double bond and thus, may have a parallel alignment in which liquid crystals are aligned to have a liquid crystal slope ranging from 0 to 6°, in other words, a pretilt angle in a horizontal direction.

The photodiamine may include a compound represented by the following Chemical Formula 4.

[Chemical Formula 4]

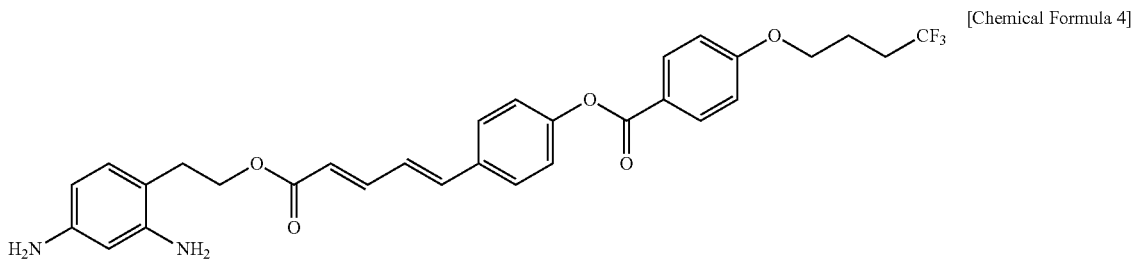 [SMILES: Nc1ccc(CCOC(=O)/C=C/C=C/c2ccc(OC(=O)c3ccc(OCCCC(F)(F)F)cc3)cc2)c(N)c1]

The functional diamine may include a compound represented by the following Chemical Formula 5.

[Chemical Formula 5]

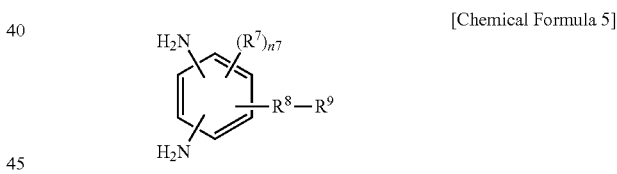

In Chemical Formula 5, each $R^7$ is independently hydrogen, substituted or unsubstituted C1 to C20 alkyl, substituted or unsubstituted C6 to C30 aryl, or substituted or unsubstituted C2 to C30 heteroaryl.

In Chemical Formula 5, $R^8$ may be a single bond, —O—, —S—, —NH—, —CO—, —CO—O—, —O—CO—, —CO—NH—, or —NH—CO—.

In Chemical Formula 5, $R^9$ may be hydrogen, a substituted or unsubstituted C1 to C40 aliphatic organic group, a substituted or unsubstituted C2 to C40 aromatic organic group, or a substituted or unsubstituted C3 to C40 alicyclic organic group.

In Chemical Formula 5, $n^7$ may be an integer of 0 to 3.

When the functional diamine is used along with the photodiamine to prepare a liquid crystal alignment agent, a desired pretilt angle may be stably formed. In addition, decrease of stability of an alignment layer due to the photodiamine and increase of reactivity due to a remaining double bond may be removed. Thus, a parallel photoalignment may be maintained stably, light leakage may be prevented, and excellent electrical properties may be accomplished.

The functional diamine may include a compound represented by the following Chemical Formula 6.

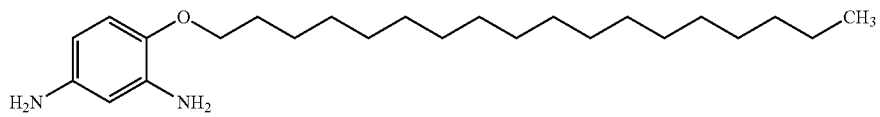
[Chemical Formula 6]

The diamine may include about 50 to about 95 mol % of the photodiamine and about 5 to about 50 mol % of the functional diamine, for example about 75 to about 95 mol % the photodiamine and about 5 to about 25 mol % of the functional diamine.

In some embodiments, the diamine may include the photodiamine in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 mol %. Further, according to some embodiments of the present invention, the amount of the photodiamine can be in a range from about any of the foregoing amounts to about any other of the foregoing amounts.

In some embodiments, the diamine may include the functional diamine in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the functional diamine can be in a range from about any of the foregoing amounts to about any other of the foregoing amounts.

When photodiamine and the functional diamine are included in amounts within the above ratio ranges, a liquid crystal alignment agent may have stable and excellent parallel photoalignment properties with small energy and excellent printability, electrical properties, and optical properties.

The diamine may further include an aromatic diamine along with the photodiamine and the functional diamine.

The aromatic diamine may include a compound represented by the following Chemical Formulae 7-1 to 7-4, or a combination thereof.

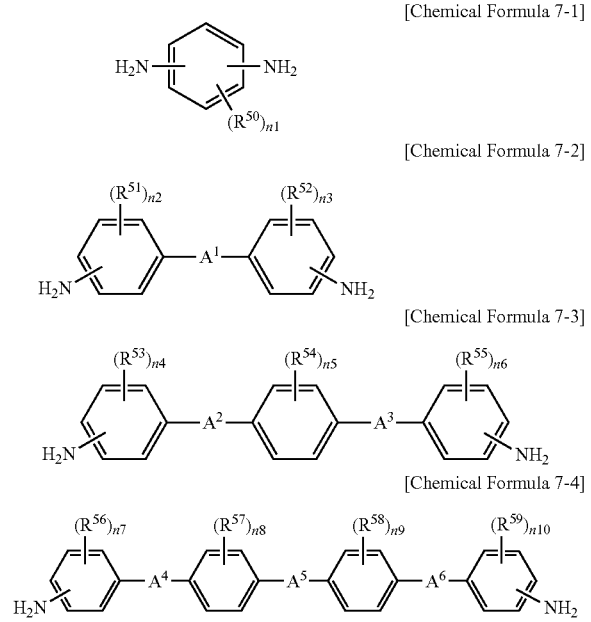

[Chemical Formula 7-1]

[Chemical Formula 7-2]

[Chemical Formula 7-3]

[Chemical Formula 7-4]

In Chemical Formulae 7-1 to 7-4, $R^{50}$ to $R^{59}$ are the same or different and are each independently hydrogen, substituted or unsubstituted C1 to C20 alkyl, substituted or unsubstituted C6 to C30 group, or substituted or unsubstituted C2 to C30 heteroaryl, wherein each of the alkyl, aryl, and heteroaryl further includes —O—, —CO—O—, —CO—NH—, —NH—CO—, —O—CO—, or a combination thereof.

In Chemical Formulae 7-1 to 7-4, $A^1$ to $A^6$ are the same or different and are each independently a single bond, —O—, —SO$_2$—, or —C($R^{203}$)($R^{204}$)— (wherein, $R^{203}$ and $R^{204}$ are the same or different and are each independently hydrogen or substituted or unsubstituted C1 to C6 alkyl).

In Chemical Formulae 7-1 to 7-4, $n^1$ to $n^{10}$ are the same or different and are each independently integers of 0 to 4.

The aromatic diamine may include a compound represented by the following Chemical Formulae 8-1 and 8-2, or a combination thereof.

[Chemical Formula 8-1]

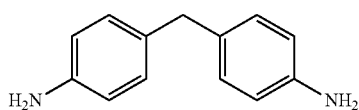
[Chemical Formula 8-2]

When the diamine includes the photodiamine, the functional diamine, and the aromatic diamine, about 50 to about 70 mol % of the photodiamine, about 5 to about 30 mol % of the functional diamine, and about 5 to about 30 mol % of the aromatic diamine may be present, for example about 60 to about 70 mol % of the photodiamine, about 10 to about 25 mol % of the functional diamine, and about 10 to about 25 mol % of the aromatic diamine may be present.

In some embodiments, the diamine may include the photodiamine in an amount of about 50, 51, 52, 53, 54, 55, 56, 57, 58, 59, 60, 61, 62, 63, 64, 65, 66, 67, 68, 69, or 70 mol %. Further, according to some embodiments of the present invention, the amount of the photodiamine can be in a range from about any of the foregoing amounts to about any other of the foregoing amounts.

In some embodiments, the diamine may include the functional diamine in an amount of about 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments of the present invention, the amount of the functional diamine can be in a range from about any of the foregoing amounts to about any other of the foregoing amounts.

In some embodiments, the diamine may include the aromatic diamine in an amount of about 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments of the present invention, the amount of the aromatic diamine can be in a range from about any of the foregoing amounts to about any other of the foregoing amounts.

When each diamine is used in an amount within the above ranges, they may realize a high a pretilt angle as well as effectively adjust a pretilt angle, effectively improve liquid crystal alignment properties, chemical resistance, electro-optical properties, thermal stability, and mechanical properties, and increase dissolution properties and thus, improve processibility.

The polyamic acid including the repeating unit represented by the above Chemical Formula 1 may be synthesized from an acid dianhydride and the diamine. The method of preparing polyamic acid by copolymerizing the acid dianhydride and the diamine is not specifically limited as long as it synthesizes the polyamic acid.

The polyimide including the repeating unit represented by the above Chemical Formula 2 may be prepared by imidizing the polyamic acid including the repeating unit represented by the above Chemical Formula 1. The method of preparing polyimide by imidizing polyamic acid is well known to one skilled in this art, so the details are omitted.

The acid dianhydride may include an alicyclic acid dianhydride, an aromatic acid dianhydride, or a combination thereof.

Examples of the alicyclic acid dianhydride may include without limitation 1,2,3,4-cyclobutanetetracarboxylic acid dianhydride (CBDA), 5-(2,5-dioxotetrahydropuryl)-3-methylcyclohexene-1,2-dicarboxylic acidanhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentanedianhydride, 1,2,3,4-tetracarboxyl cyclopentanedianhydride, 2,3,5-tricarboxylcyclopentyl acetic acid dianhydride (2,3,5-tricarboxycyclopentyl acetic dianhydride, TCA-AH), and the like, and combinations thereof.

The tetravalent organic group derived from the alicyclic acid dianhydride may include at least one of the functional groups represented by the following Chemical Formulae 9-1 to 9-5, as well as a combination thereof, but is not limited thereto.

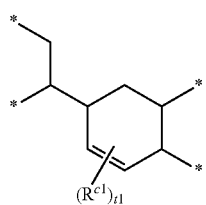

[Chemical Formula 9-1]

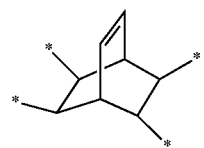

[Chemical Formula 9-2]

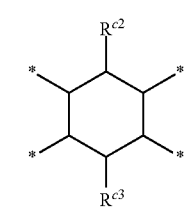

[Chemical Formula 9-3]

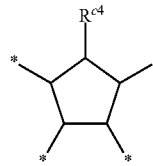

[Chemical Formula 9-4]

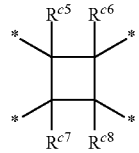

[Chemical Formula 9-5]

In Chemical Formula 9-1, each $R^{c1}$ is independently hydrogen, substituted or unsubstituted C1 to C20 alkyl, substituted or unsubstituted C6 to C30 aryl, or substituted or unsubstituted C2 to C30 heteroaryl, and $t^1$ is an integer of 0 to 3. In Chemical Formula 9-1, when $t^1$ is an integer of 2 or more, each $R^{c1}$ may be the same or different.

In Chemical Formulae 9-3 to 9-5, $R^{c2}$ to $R^{c8}$ are the same or different and are each independently hydrogen, substituted or unsubstituted C1 to C20 alkyl, substituted or unsubstituted C6 to C30 aryl, or substituted or unsubstituted C2 to C30 heteroaryl.

Examples of the aromatic acid dianhydride may include without limitation pyromellitic acid dianhydride (PMDA), biphthalic acid dianhydride (BPDA), oxydiphthalic acid dianhydride (ODPA), benzophenonetetracarboxylic acid dianhydride (BTDA), hexafluoroisopropylidene diphthalic acid dianhydride (6-FDA), and the like, and combinations thereof.

The tetravalent organic group derived from the aromatic acid dianhydride may include at least one selected from the following Chemical Formulae 10-1 and 10-2, as well as a combination thereof, but is not limited thereto.

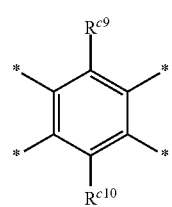

[Chemical Formula 10-1]

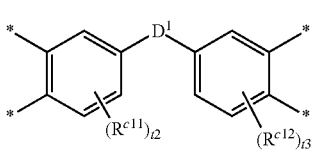

[Chemical Formula 10-2]

In the above Chemical Formula 10-1, $R^{c9}$ and $R^{c10}$ are the same or different and are each independently hydrogen, substituted or unsubstituted C1 to C20 alkyl, substituted or unsubstituted C6 to C30 aryl, or substituted or unsubstituted C2 to C30 heteroaryl.

In Chemical Formula 10-2, $R^{c11}$ and $R^{c12}$ are the same or different and are each independently hydrogen, substituted or unsubstituted C1 to C20 alkyl, substituted or unsubstituted C6 to C30 aryl, or substituted or unsubstituted C2 to C30 heteroaryl, and $t^2$ and $t^3$ are the same or different and are each independently an integer of 0 to 3. When $t^2$ is an integer of 2 or more, each $R^{c11}$ may be the same or different, and when $t^3$ is an integer of 2 or more, each $R^{c12}$ may be the same or different.

In Chemical Formula 10-2, $D^1$ may be a single bond, —O—, —CO—, substituted or unsubstituted C1 to C6 alkylene (e.g., —C(CF$_3$)$_2$—), substituted or unsubstituted C3 to C30 cycloalkylene, or substituted or unsubstituted C2 to C30 heterocycloalkylene.

Each of the polyamic acid and the polyimide may have a weight average molecular weight of about 10,000 to about 300,000 g/mol, for example about 100,000 to about 250,000 g/mol. When the polyamic acid and the polyimide have a weight average molecular weight within the above range, reliability and electro-optical properties may be improved, chemical resistance may be excellent, and pretilt angles even after driving the liquid crystal display may be maintained stably.

When the polymer includes both the polyamic acid and the polyimide, the polyamic acid and the polyimide may be present in a weight ratio of about 1:99 to 50:50, for example about 10:90 to about 50:50.

In some embodiments, the combination of the polyamic acid and the polyimide may include the polyamic acid in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the polyamic acid can be in a range from about any of the foregoing amounts to about any other of the foregoing amounts.

In some embodiments, the combination of the polyamic acid and the polyimide may include the polyimide in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polyimide can be in a range from about any of the foregoing amounts to about any other of the foregoing amounts.

When the polyamic acid and the polyimide are included in amounts within the above range, alignment stability may be improved.

The liquid crystal alignment agent may include the polymer in an amount of about 1 wt % to about 25 wt %, for example about 3 wt % to about 20 wt % based on the total amount (weight) of the liquid crystal alignment agent.

In some embodiments, the liquid crystal alignment agent may include the polymer in an amount of about 1, 2, 3, 4, 5, 6, 7, 8, 9, 10, 11, 12, 13, 14, 15, 16, 17, 18, 19, 20, 21, 22, 23, 24, or 25 wt %. Further, according to some embodiments of the present invention, the amount of the polymer can be in a range from about any of the foregoing amounts to about any other of the foregoing amounts.

When the polymer is included in an amount within the above range, printability and parallel alignment properties of liquid crystals may be improved.

(B) Solvent

The liquid crystal alignment agent according to one embodiment includes a suitable solvent to dissolve the polymer. The solvent provides a liquid crystal alignment agent that can have excellent spreadability and tackiness with substrate.

Examples of the solvent may include without limitation N-methyl-2-pyrrolidone; N,N-dimethyl acetamide; N,N-dimethyl formamide; dimethyl sulfoxide; γ-butyrolactone; tetrahydrofuran (THF); and phenol-based solvents such as meta cresol, phenol, halgenated phenols, and the like, and combinations thereof.

The solvent may further include 2-butyl cellosolve (2-BC), which can improve printability. The solvent may include 2-butyl cellosolve in an amount of about 1 wt % to about 50 wt %, for example about 10 to about 40 wt %, based on the total amount (weight) of the solvent including 2-butyl cellosolve. In some embodiments, the solvent may include 2-butyl cellosolve in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, or 50 wt %. Further, according to some embodiments of the present invention, the amount of 2-butyl cellosolve can be in a range from about any of the foregoing amounts to about any other of the foregoing amounts.

When the 2-butyl cellosolve is included in an amount within the above range, printability may be easily improved.

The solvent may further include a poor solvent. Examples of poor solvents may include without limitation alcohols, ketones, esters, ethers, hydrocarbons, halgenated hydrocarbons, and the like, and combinations thereof. The poor solvent may be present in an appropriate ratio as long as the polymer (A) is not precipitated. The poor solvents can decrease the surface energy of liquid crystal alignment agent to improve the spreadability and the flatness during the coating.

The solvent may include the poor solvent in about 1 wt % to about 90 wt %, for example about 1 wt % to about 70 wt %, based on the total amount (weight) of solvent including the poor solvent.

Examples of the poor solvent may include without limitation methanol, ethanol, isopropanol, cyclohexanol, ethylene glycol, propylene glycol, 1,4-butanediol, triethylene glycol, acetone, methylethylketone, cyclohexanone, methylacetate, ethylacetate, butylacetate, diethyloxalate, malonic acid ester, diethylether, ethylene glycol monomethylether, ethylene glycol dimethylether, ethylene glycol monoethylether, ethylene glycol phenylether, ethylene glycol phenylmethylether, ethylene glycol phenylethylether, diethylene glycol dimethylether, diethylene glycol ether, diethylene glycol monomethylether, diethylene glycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and the like, and combinations thereof.

Although the amount of solvent is not specifically limited in the liquid crystal alignment agent, the liquid crystal alignment agent may include the solvent in an amount sufficient to provide a solid content of about 0.1 wt % to about 30 wt %, for example about 1 wt % to about 25 wt %. In some embodiments, the liquid crystal alignment agent may have a solid content of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the solid content of the liquid crystal alignment agent can be in a range from about any of the foregoing amounts to about any other of the foregoing amounts.

When the solid content is in an amount within the above range, the liquid crystal alignment agent may be less affected by impurities on the surface of a substrate during the printing to suitably maintain the uniformity of layer. Thereby, it may prevent the deterioration of layer uniformity due to the high viscosity during the printing process and to provide an appropriate transmittance.

(C) Other Additive(s)

The liquid crystal alignment agent according to one embodiment may further include one or more other additives.

The other additive may include an epoxy compound. The epoxy compound can improve the reliability and the electro-optical characteristics, and the epoxy compound may include at least one kind of epoxy compounds having 2 to 8 epoxy groups, for example, 2 to 4 epoxy groups.

The liquid crystal alignment agent may include the epoxy compound in an amount of about 0.1 parts by weight to about 50 parts by weight, for example about 1 part by weight to about 30 parts by weight, based on about 100 parts by weight of the polymer (A). When the epoxy compound is included in an amount within the above range, appropriate printability and flatness may be provided during coating on the substrate, and also reliability and electro-optical properties may be easily improved.

Examples of the epoxy compound may include without limitation N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethylene glycoldiglycidylether, polyethylene glycoldiglycidylether, propylene glycoldiglycidylether, tripropylene glycoldiglycidylether, polypropylene glycoldiglycidylether, neopentylglycoldiglycidylether, 1,6-hexanedioldiglycidylether, glycerinediglycidylether, 2,2-dibromoneopentylglycoldiglycidylether, 1,3,5,6-tetraglycidyl-2,4-hexanediol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, and combinations thereof.

In addition, in order to improve the printability, the liquid crystal alignment agent may further include appropriate additives such as a surfactant and/or a coupling agent.

The liquid crystal alignment film according to another embodiment may be manufactured by using the liquid crystal alignment agent.

The liquid crystal alignment film may be formed by coating the liquid crystal alignment agent on the substrate. The method of coating the liquid crystal alignment agent on the substrate may include spin coating, flexo printing, inkjet printing, and the like. Among them, the flexo printing may be generally used since it can provide excellent uniformity of a formed coating layer and can easily provide a large size print.

The substrate is not specifically limited as long as it has a high transparency. Examples of the substrate may include without limitation glass substrates and plastic substrates, such as acrylic substrates, polycarbonate substrates, and the like. In addition, it may simplify the process if the substrate is formed with an indium-tin oxide (ITO) electrode or the like for driving liquid crystal.

In order to increase the coating uniformity, a pre-drying process may be performed at a temperature of room temperature to about 200° C., for example about 30° C. to about 150° C., and as another example about 40° C. to about 120° C. for about 1 minute to about 100 minutes after uniformly coating the liquid crystal alignment agent on the substrate. The pre-drying process may control the volatilization of each component of the liquid crystal alignment agent to help provide a uniform coating layer having minimal or no deviation.

Then it may be baked at a temperature of about 80° C. to about 300° C., for example a temperature of about 120° C. to about 280° C. for about 5 minutes to about 300 minutes to evaporate the solvent and to provide a liquid crystal alignment film.

The obtained liquid crystal alignment film may be used for a liquid crystal display with a uniaxial orientation by a polarization ultraviolet (UV) irradiation or without a uniaxial orientation in certain applications such as a vertical alignment layer or the like.

According to further another embodiment, a liquid crystal display is provided that includes the liquid crystal alignment film.

The following examples illustrate this disclosure in more detail. However, they are exemplary embodiments of this disclosure and are not limiting.

Preparation of Polymer

Preparation Example 1

Preparation of Polyamic Acid 0.95 moles of photodiamine represented by the following Chemical Formula 4, and 0.05 moles of functional diamine represented by the following Chemical Formula 6 are put into a 4-necked flask including an agitator, a temperature controlling device, a nitrogen gas injection tube, and a cooler under dark room conditions while passing nitrogen therethrough, and N-methyl-2-pyrrolidone (NMP) is added and dissolved. 1.0 mole of a solid 4,10-dioxa-tricyclo[6.3.1.0$^{2,7}$]dodecan-3,5,9,11-tetraone is added thereto, and vigorously agitated. Herein, a solid content is 25 wt %, and a reaction is performed for 24 hours while the temperature is maintained at 30 to 60° C. to prepare a polyamic acid solution. The prepared solution is distilled to obtain polyamic acid.

[Chemical Formula 4]

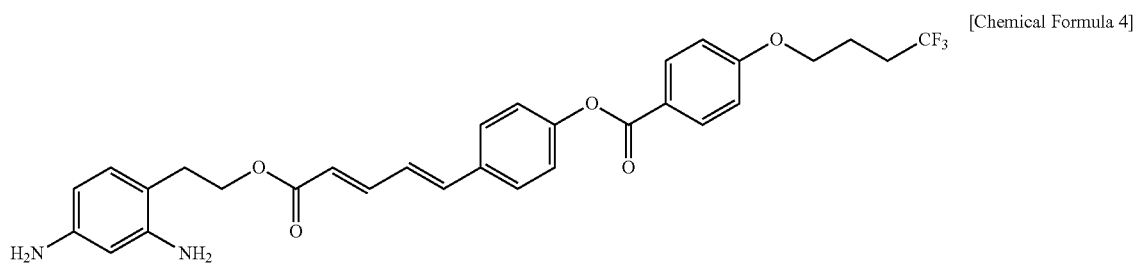 [SMILES: Nc1ccc(CCOC(=O)/C=C/C=C/c2ccc(OC(=O)c3ccc(OCCCC(F)(F)F)cc3)cc2)c(N)c1]

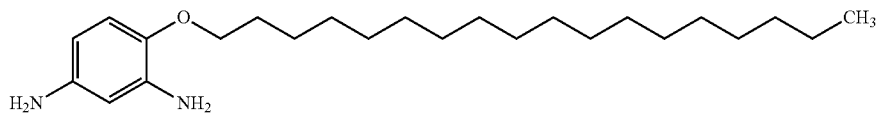

[Chemical Formula 6]

Preparation Example 2

Preparation of Polyamic Acid

Polyamic acid is prepared in accordance with the same method as in Preparation Example 1, except that 0.90 moles of photodiamine represented by the above Chemical Formula 4, and 0.10 moles of functional diamine represented by the following Chemical Formula 6 are used.

Preparation Example 3

Preparation of Polyamic Acid

Polyamic acid is prepared in accordance with the same method as in Preparation Example 1, except that 0.80 moles of photodiamine represented by the above Chemical Formula 4, and 0.20 moles of functional diamine represented by the following Chemical Formula 6 are used.

Preparation Example 4

Preparation of Polyamic Acid

Polyamic acid is prepared in accordance with the same method as in Preparation Example 1, except that 0.70 moles of photodiamine represented by the above Chemical Formula 4, 0.20 moles of functional diamine represented by the following Chemical Formula 6, and 0.10 moles of aromatic diamine represented by the following Chemical Formula 8-1 are used.

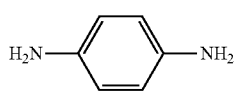

[Chemical Formula 8-1]

Preparation Example 5

Preparation of Polyamic Acid

Polyamic acid is prepared in accordance with the same method as in Preparation Example 1, except that 0.60 moles of photodiamine represented by the above Chemical Formula 4, 0.20 moles of functional diamine represented by the following Chemical Formula 6, 0.15 moles of aromatic diamine represented by the above Chemical Formula 8-1, and 0.05 moles of aromatic diamine represented by the following Chemical Formula 8-2 are used.

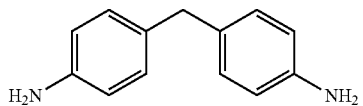

[Chemical Formula 8-2]

Preparation Example 6

Preparation of Polyamic Acid

Polyamic acid is prepared in accordance with the same method as in Preparation Example 1, except that 0.50 moles of photodiamine represented by the above Chemical Formula 4, 0.25 moles of functional diamine represented by the following Chemical Formula 6, 0.20 moles of aromatic diamine represented by the above Chemical Formula 8-1, and 0.05 moles of aromatic diamine represented by the following Chemical Formula 8-2 are used.

Preparation Examples 7 to 12

Preparation of Polyimide 3.0 moles of acetic anhydride and 5.0 moles of pyridine are added to each polyamic acid solution according to Preparation Examples 1 to 6, cyclization reactions are performed at 80° C. for 6 hours, and catalysts and solvents are removed through vacuum distillation to prepare polyimide having a solid content of 20%.

Comparative Preparation Example 1

Preparation of Polyamic Acid 0.90 moles of photodiamine represented by the above Chemical Formula 4 and 0.10 moles of aromatic diamine represented by the following Chemical Formula 11 are put into a 4-necked flask including an agitator, a temperature controlling device, a nitrogen gas injection tube, and a cooler under dark room conditions while passing nitrogen therethrough, and N-methyl-2-pyrrolidone (NMP) is added and dissolved. 1.0 mole of a solid 4,10-dioxa-tricyclo[6.3.1.0$^{2,7}$] dodecan-3,5,9,11-tetraone is added thereto, and vigorously agitated. Herein, a solid content is 25 wt %, and a reaction is performed for 24 hours while the temperature is maintained at 30 to 60° C. to prepare a polyamic acid solution. The prepared solution is distilled to obtain polyamic acid.

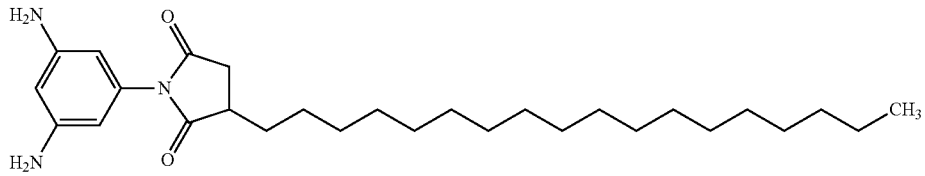

[Chemical Formula 11]

Comparative Preparation Example 2

Preparation of Polyimide 3.0 moles of acetic anhydride and 5.0 moles of pyridine are added to the polyamic acid solution according to Comparative Preparation Example 1, a cyclization reaction is performed at 80° C. for 6 hours, and catalysts and solvents are removed through vacuum distillation to prepare polyimide having a solid content of 20%.

Comparative Preparation Example 3

Preparation of Polyamic Acid 0.95 moles of photodiamine represented by following Chemical Formula 12 and 0.05 moles of functional amine represented by the above Chemical Formula 6 are put into a 4-necked flask including an agitator, a temperature controlling device, a nitrogen gas injection tube, and a cooler under dark room conditions while passing nitrogen therethrough, and N-methyl-2-pyrrolidone (NMP) is added and dissolved. 1.0 mole of a solid 4,10-dioxa-tricyclo[6.3.1.0$^{2,7}$]dodecan-3,5,9,11-tetraone is added thereto, and vigorously agitated. Herein, a solid content is 25 wt %, and a reaction is performed for 24 hours while the temperature is maintained at 30 to 60° C. to prepare a polyamic acid solution. The prepared solution is distilled to obtain polyamic acid.

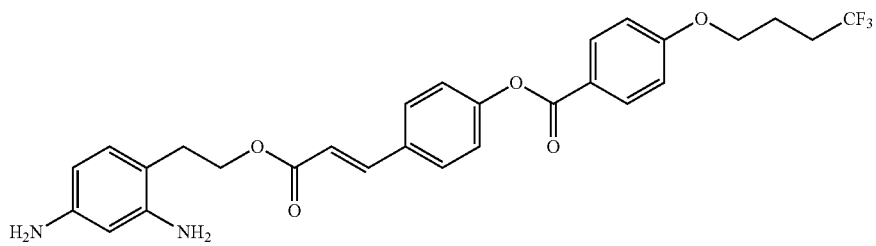

[Chemical Formula 12]

Preparation of Liquid Crystal Alignment Agent

Examples 1 to 12 and Comparative Examples 1 to 3

The polymers according to Preparation Examples 1 to 12 and Comparative Preparation Examples 1 to 3 are added to a mixed solvent (volume ratio=3:4:3) of N-methyl-2-pyrrolidone (NMP), γ-butyrolactone, and 2-butyl cellosolve so that entire solids might be 7 wt %, and the resultant is agitated at room temperature for 24 hours to prepare liquid crystal alignment agents.

TABLE 1

|  |  | Photodiamine (mol %) | Functional diamine (mol %) | Aromatic diamine (mol %) | | |
|---|---|---|---|---|---|---|
|  |  |  |  | Chemical Formula 8-1 | Chemical Formula 8-2 | Chemical Formula 11 |
| Example 1 | Preparation Example 1 | 95 | 5 | — | — | — |
| Example 2 | Preparation Example 2 | 90 | 10 | — | — | — |
| Example 3 | Preparation Example 3 | 80 | 20 | — | — | — |
| Example 4 | Preparation Example 4 | 70 | 20 | 10 | — | — |
| Example 5 | Preparation Example 5 | 60 | 20 | 15 | 5 | — |
| Example 6 | Preparation Example 6 | 50 | 25 | 20 | 5 | — |
| Example 7 | Preparation Example 7 | 95 | 5 | — | — | — |
| Example 8 | Preparation Example 8 | 90 | 10 | — | — | — |
| Example 9 | Preparation Example 9 | 80 | 20 | — | — | — |
| Example 10 | Preparation Example 10 | 70 | 20 | 10 | — | — |
| Example 11 | Preparation Example 11 | 60 | 20 | 15 | 5 | — |
| Example 12 | Preparation Example 12 | 50 | 25 | 20 | 5 | — |
| Comparative Example 1 | Comparative Preparation Example 1 | 90 | — | — | — | 10 |
| Comparative Example 2 | Comparative Preparation Example 2 | 90 | — | — | — | 10 |
| Comparative Example 3 | Comparative Preparation Example 3 | 95 | 5 | — | — | — |

Evaluation 1: Evaluation of Liquid Crystal Alignment Properties of Liquid Crystal Alignment Agents Photolithography for patterning is performed to remove the rest of indium-tin oxide (ITO) except for 1.5 cm×1.5 cm square-shaped ITO and an ITO electrode shape for voltage application on a standardized ITO glass substrate.

The liquid crystal alignment agents of Examples 1 to 12 and Comparative Examples 1 to 3 are spin-coated to be 0.1 µm thick on the patterned ITO substrate and cured at a temperature of 70° C. and 210° C.

The cured ITO substrate is exposed to a light under a predetermined angle and a predetermined energy by using an exposure device (UIS-S2021J7-YD01, Ushio LPUV). Two exposed substrates are bonded together by being arranged in an opposite exposure direction (VA mode, 90 degrees) and maintaining a cell gap of 4.75 µm with the ITO square shapes at the top and bottom being aligned. The exposure is performed by using a light source of a 2 kW deep UV lamp (UXM-2000).

The obtained liquid crystal cells are filled with a liquid crystal. Liquid crystal alignment properties of each liquid crystal cell are measured by using a vertically-polarized optical microscope. The results are shown in the following Table 2.

<References for Evaluating the Liquid Crystal Alignment Properties>
Good: no disclination
Bad: disclination Evaluation 2: Evaluation of Electrical Properties of Liquid Crystal Photoalignment Layer Voltage holding ratios (VHR) of the liquid crystal cells obtained in the Evaluation 1 are measured at room temperature. The results are shown in the following Table 2.

The voltage holding ratio indicates the degree that the charged voltage is maintained by the liquid crystal layer floated with extraneous power for random period in active matrix mode TFT-LCD, which is preferable to approach 100%.

<References for Evaluating Voltage Holding Ratio>
Good: voltage holding ratio of greater than or equal to 97%
Bad: voltage holding ratio of less than 97%

TABLE 2

|  | Alignment properties | Voltage holding ratio |
|---|---|---|
| Example 1 | Good | Good |
| Example 2 | Good | Good |
| Example 3 | Good | Good |
| Example 4 | Good | Good |
| Example 5 | Good | Good |
| Example 6 | Good | Good |
| Example 7 | Good | Good |
| Example 8 | Good | Good |
| Example 9 | Good | Good |
| Example 10 | Good | Good |
| Example 11 | Good | Good |
| Example 12 | Good | Good |
| Comparative Example 1 | Bad | Good |
| Comparative Example 2 | Bad | Good |
| Comparative Example 3 | Bad | Good |

Referring to Table 2, the polymers according to Examples 1 to 12 have stable parallel photoalignment properties and excellent electrical properties compared with the ones according to Comparative Examples 1 to 3.

The polymers according to Comparative Examples 1 and 2 included no functional diamine and thus have deteriorated parallel photoalignment properties. In addition, the polymer according to Comparative Example 3 included a different kind of photodiamine from the photodiamine according to the embodiment and thus has a vertical alignment rather than a parallel alignment.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal alignment agent, comprising:

a polymer, wherein the polymer includes:

polyamic acid including a repeating unit represented by the following Chemical Formula 1, polyimide including a repeating unit represented by the following Chemical Formula 2, or a combination of the polyamic acid including a repeating unit represented by the following Chemical Formula 1 and the polyimide including a repeating unit represented by the following Chemical Formula 2:

[Chemical Formula 1]

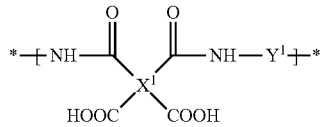

[Chemical Formula 2]

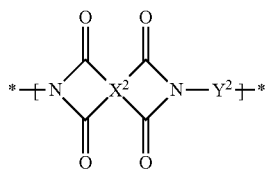

wherein, in Chemical Formulae 1 and 2, $X^1$ and $X^2$ are the same or different and are each independently a tetravalent organic group derived from alicyclic acid dianhydride or aromatic acid dianhydride, and $Y^1$ and $Y^2$ are the same or different and are each independently a divalent organic group derived from diamine, wherein the diamine includes both a photodiamine represented by the following Chemical Formula 3 and a diamine represented by the following Chemical Formula 5, wherein the diamine of Chemical Formula 5 is not the same as the diamine of Chemical Formula 3,

[Chemical Formula 3]

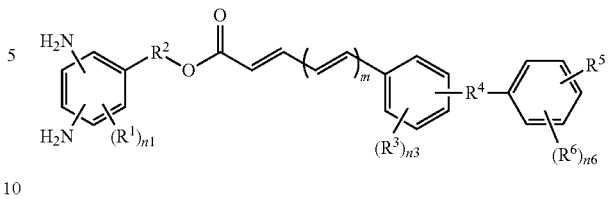

wherein, in Chemical Formula 3, $R^1$, $R^3$, and $R^6$ are the same or different and are each independently hydrogen or substituted or unsubstituted C1 to C10 alkyl, $R^2$ and $R^4$ are the same or different and are each independently a single bond, substituted or unsubstituted C1 to C10 alkylene, —O—, —CO—O—, —CO—NH—, —NH—CO—, or —O—CO—, $R^5$ is substituted or unsubstituted C1 to C30 alkyl, substituted or unsubstituted C1 to C30 alkoxy, or a substituted or unsubstituted C2 to C30 ether group, n1 is 3, n3 and n6 are each independently 4, and m is an integer ranging from 1 to 5,

[Chemical Formula 5]

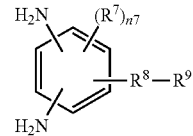

wherein, in Chemical Formula 5, each $R^7$ is independently hydrogen, substituted or unsubstituted C1 to C20 alkyl, substituted or unsubstituted C6 to C30 aryl, or substituted or unsubstituted C2 to C30 heteroaryl, $R^8$ is a single bond, —O—, —S—, —NH—, —CO—, —CO—O—, —O—CO—, —CO—NH—, or —NH—CO—, $R^9$ is hydrogen, a substituted or unsubstituted C1 to C40 aliphatic organic group, a substituted or unsubstituted C2 to C40 aromatic organic group, or a substituted or unsubstituted C3 to C40 alicyclic organic group, and n7 is 3, wherein the term substituted refers to one substituted with halogen, hydroxyl, C1 to C20 alkoxy, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, a C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof.

2. The liquid crystal alignment agent of claim 1, wherein the photodiamine comprises a compound represented by the following Chemical Formula 4:

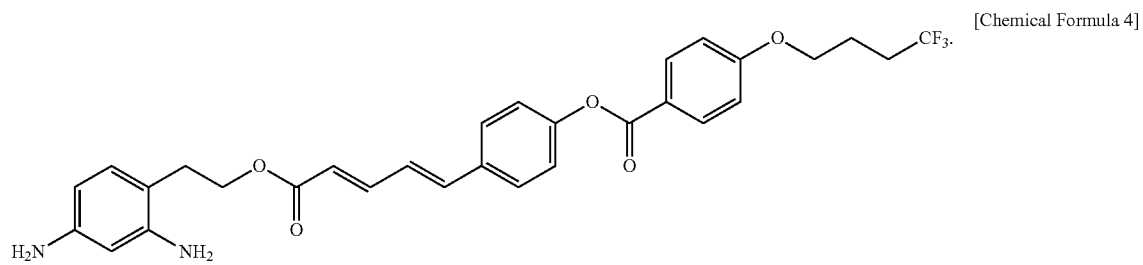 [SMILES: Nc1ccc(CCOC(=O)/C=C/C=C/c2ccc(OC(=O)c3ccc(OCCCC(F)(F)F)cc3)cc2)c(N)c1]

[Chemical Formula 4]

3. The liquid crystal alignment agent of claim 1, wherein the diamine of Chemical Formula 5 comprises a compound represented by the following Chemical Formula 6:

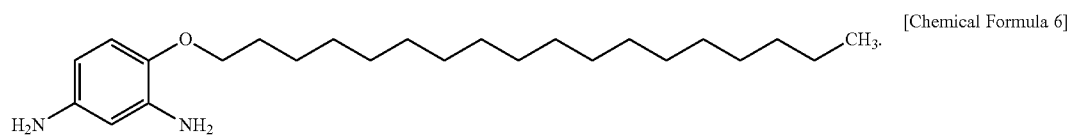 [SMILES: CCCCCCCCCCCCCCCCCCOc1ccc(N)cc1N]

[Chemical Formula 6]

4. The liquid crystal alignment agent of claim 1, wherein the diamine comprises about 50 to about 95 mol % of the photodiamine and about 5 to about 50 mol % of the diamine of Chemical Formula 5.

5. The liquid crystal alignment agent of claim 1, wherein each of the polyamic acid and the polyimide has a weight average molecular weight of about 10,000 to about 300,000 g/mol.

6. The liquid crystal alignment agent of claim 1, wherein the polyamic acid and the polyimide are included in a weight ratio of about 1:99 to about 50:50 when the polymer comprises the polyamic acid and the polyimide.

7. The liquid crystal alignment agent of claim 1, wherein the liquid crystal alignment agent has a solid content of about 0.1 to about 30 wt %.

8. A liquid crystal alignment agent, comprising:
a polymer, wherein the polymer includes:
polyamic acid including a repeating unit represented by the following Chemical Formula 1,
polyimide including a repeating unit represented by the following Chemical Formula 2, or
a combination of the polyamic acid including a repeating unit represented by the following Chemical Formula 1 and the polyimide including a repeating unit represented by the following Chemical Formula 2:

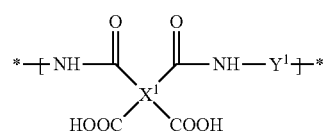

[Chemical Formula 1]

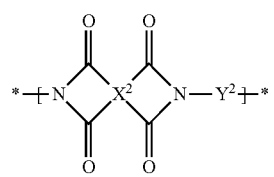

[Chemical Formula 2]

wherein, in Chemical Formulae 1 and 2,
$X^1$ and $X^2$ are the same or different and are each independently a tetravalent organic group derived from alicyclic acid dianhydride or aromatic acid dianhydride, and
$Y^1$ and $Y^2$ are the same or different and are each independently a divalent organic group derived from diamine, wherein the diamine includes both a photodiamine represented by the following Chemical Formula 4 and a diamine represented by the following Chemical Formula 6,

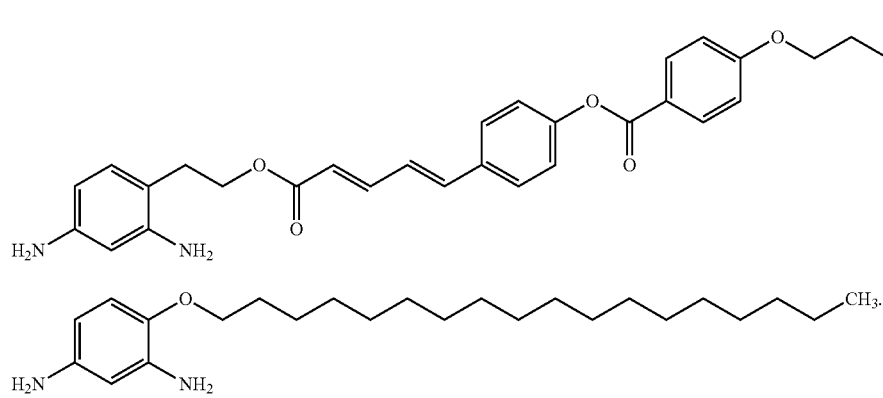
[Chemical Formula 4]
[Chemical Formula 6]
* * * * *

UNITED STATES PATENT AND TRADEMARK OFFICE
CERTIFICATE OF CORRECTION

PATENT NO. : 8,969,486 B2
APPLICATION NO. : 13/591614
DATED : March 3, 2015
INVENTOR(S) : Jae-Deuk Yang et al.

Page 1 of 1

It is certified that error appears in the above-identified patent and that said Letters Patent is hereby corrected as shown below:

In the Specification

Column 2, Chemical Formula 2 is depicted as:

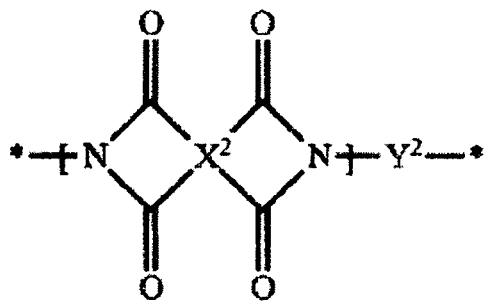

and should be depicted as:

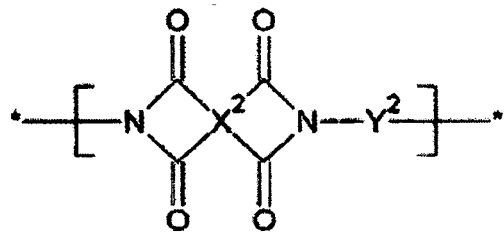

Column 3, Line 14 reads: "$R^5$ is a single bond, -O-,-S-,-NH-, -CO-,"
and should read: "$R^8$ is a single bond, -O-,-S-,-NH-, -CO-,"

Column 6, Line 13 reads: "$S(=O)_2$, $Si(CH_3)_2$, $(CH_2)_p$ (wherein, $(CF_2)_q$ (wherein,"
and should read: "$S(=O)_2$, $Si(CH_3)_2$, $(CH_2)_p$ (wherein, $1 \leq p \leq 2$), $(CF_2)_q$ (wherein,"

Signed and Sealed this
Twenty-fifth Day of August, 2015

Michelle K. Lee
*Director of the United States Patent and Trademark Office*